United States Patent [19]

Rubens

[11] 4,186,068
[45] Jan. 29, 1980

[54] FOAMED RADIATION-CROSSLINKED HIGH DENSITY POLYETHYLENES

[75] Inventor: Louis C. Rubens, Midland, Mich.

[73] Assignee: The Dow Chemical Company, Midland, Mich.

[21] Appl. No.: 860,344

[22] Filed: Dec. 14, 1977

Related U.S. Application Data

[63] Continuation-in-part of Ser. No. 757,538, Jan. 7, 1977, abandoned.

[51] Int. Cl.$^2$ ............................ C08F 2/46; C08F 8/18
[52] U.S. Cl. ............................ 204/159.2; 204/159.18; 521/95; 521/143; 521/915
[58] Field of Search ........................ 204/159.18, 159.2; 260/2.5 HA, 2.5 E; 521/915

[56] References Cited

U.S. PATENT DOCUMENTS

| | | | |
|---|---|---|---|
| 3,098,831 | 7/1963 | Carr | 260/2.5 |
| 3,470,119 | 9/1969 | Benning et al. | 260/2.5 |
| 3,562,367 | 2/1971 | Shinohara et al. | 264/25 |
| 3,711,584 | 1/1973 | Sagane et al. | 264/54 |
| 3,852,177 | 12/1974 | Atchinson et al. | 204/159.17 |

FOREIGN PATENT DOCUMENTS

50-12160  2/1975  Japan.
50-61463  5/1975  Japan.

OTHER PUBLICATIONS

J. Polymer Sci., 32, 257–290, Lawton et al., 1958.
Benning, C. J., *Plastic Foams*, published by John Wiley & Sons, p. 334, 1969.

*Primary Examiner*—Richard B. Turer
*Attorney, Agent, or Firm*—T. R. Wills

[57] ABSTRACT

Foamed radiation-crosslinked high density polyethylenes having substantially closed cells and uniform structure are made from radiation-crosslinked high density polyethylene compositions comprising thermosensitive foaming agents by heating such compositions while excluding molecular oxygen from contact therewith during that heating and foaming step. Oxygen is excluded by providing an oxygen-free inert gas atmosphere or by submerging the foamable material beneath the surface of a body of liquid heat transfer medium during the heating and foaming step.

6 Claims, No Drawings

FOAMED RADIATION-CROSSLINKED HIGH DENSITY POLYETHYLENES

CROSS-REFERENCE TO RELATED APPLICATION

This is a continuation-in-part of application Ser. No. 757,538, filed Jan. 7, 1977, now abandoned.

BACKGROUND OF THE INVENTION

This invention relates to making cellular resin products having substantially closed cell structure from radiation-crosslinked high density polyethylene.

It is known from U.S. Pat. No. 3,470,119, C. J. Benning et al., to make molded foam articles from high density polyethylene which is crosslinked during the foaming step by action of chemical crosslinking agents, e.g., certain organic peroxides. In such technology, a uniform mixture of polyethylene, chemical crosslinking agent and foaming agent is shaped at a temperature below the decomposition temperature of such agents, which agents decompose at similar temperatures above the melting point of the polyethylene, and the so-shaped mixture is heated to the decomposition temperature of said agents in the substantial absence of atmospheric oxygen, e.g., in an atmosphere of nitrogen gas. Exclusion of oxygen is necessary because oxygen was found to seriously inhibit the crosslinking reaction by the chemical crosslinking agents. However, such technology is disadvantageous because it requires successfully performing the trick of carrying out the chemical crosslinking reaction and the foaming step at precisely the same time. Moreover, when the process is successful, the polyethylene matrix in the resulting foam product is chemically crosslinked. The technology of U.S. Pat. No. 3,470,119 is not applicable to radiation-crosslinked polyethylene because polyethylene which has been pre-crosslinked by radiation cannot be uniformly mixed with blowing agent or shaped by heat without damage to the crosslinked structure.

It is known from U.S. Pat. No. 3,562,367, Shinohara et al., to make foamed sheet from radiation-crosslinked polyethylene. According to this patent, a non-cellular foamable sheet is made by forming a mixture comprising polyethylene and chemical foaming agent such as azodicarbonamide, melt-blending the mixture without decomposing the chemical foaming agent, forming the melt-blended mixture into a sheet, and irradiating the sheet with ionizing radiation to effect partial crosslinking thereof. The resulting non-cellular, foamable, radiation-crosslinked sheet is then caused to foam by floating it on the surface of a heated liquid bath while concurrently heating the upper surface of the sheet by infrared heaters thereabove. The process gives good results in uniform closed-cell foam sheet when the starting polymer is low-density polyethylene, and the process is alleged to be operable with other kinds of polyethylene. However, when the starting foamable sheet is composed of linear, highly crystalline, high density polyethylene, float-foaming in the manner of U.S. Pat. No. 3,562,367 does not produce a satisfactory foamed sheet product. The foamed product tends to collapse leading to non-uniform foam, irregular cell size and foam density, rough, irregular surface, and distorted shape. Also, the foam lacks the strength and toughness that would be expected from linear, high density polyethylene.

The result just described is not specifically related to heating by floating the sheet on molten salt. A similar unacceptable result is obtained when foamable irradiation-crosslinked sheet composed of linear high density polyethylene and chemical foaming agent is heated in air in the manner described in U.S. Pat. No. 3,711,584, Sagane et al. Although the method of that patent gives uniform foam sheet when the irradiation-crosslinked composition is based on low density polyethylene, such result is not obtained when the starting foamable sheet is based on high density polyethylene.

The art prior to the present invention has not shown means for making cellular resin products of uniform quality with good physical properties from radiation-crosslinked high density polyethylene, especially in the form of sheets, although such products would be desirable.

It is an object of this invention to provide cellular resin products, having substantially closed cell structure, uniform quality and good physical properties, from radiation-crosslinked high density polyethylene.

Another object is to provide such means to make such radiation-crosslinked high density polyethylene foam in the form of sheet having uniform foam structure and smooth, regular surfaces on both sides, free of distortion.

Other objects and advantages of the invention will be brought out in the description that follows.

BRIEF SUMMARY OF THE INVENTION

The objects of this invention are attained by heating to effect foaming of a radiation-crosslinked preformed non-cellular foamable article, e.g., a sheet, composed essentially of high density polyethylene and chemical foaming agent which decomposes by heating to form a gas at decomposing temperature above the softening temperature of the polyethylene, particularly characterized by carrying out the step of heating and foaming the radiation-crosslinked high density polyethylene composition in the substantial absence of molecular oxygen, i.e., excluding air and other sources of molecular oxygen from contact with the radiation-crosslinked high density polyethylene composition during the heating and foaming thereof.

Molecular oxygen is excluded from contact with the radiation-crosslinked high density polyethylene composition by surrounding the same during the heating and foaming step with oxygen-free inert gas atmosphere or by immersing the foamable composition in molten low-melting salts and mixtures of salts to effect heating and foaming of the composition. Suitable inert gases include nitrogen, carbon dioxide, the noble gases, gaseous fluorocarbons, inert vapors of volatile liquids, and mixtures thereof.

In one aspect, the invention is in the new method as herein described and particularly characterized. In another aspect, the invention is in the new foamed products as described and particularly characterized.

The radiation-crosslinked high density polyethylene foam products of this invention have uniform, substantially closed, fine cell structures. They are, even in low density and highly expanded forms, strong and tough. In the form of sheet, the new foam products are uniform through the sections, smooth, regular and of good color on both surfaces, and free of cracks, wrinkles or other distortion of shape. The new foam sheet is readily heat-formable, without loss of physical properties, to complex shapes, including drawn shapes, which are strong and tough and which have dimensional stability.

DETAILED DESCRIPTION OF THE INVENTION

The invention is carried out with high density polyethylene. By "high density polyethylene" is meant a normally solid polymer of ethylene wherein the polymer molecules have substantially linear backbone chain structure, and annealed density, measured at 25° C. by displacement, of at least 0.94 gram per cubic centimeter (g/cc), e.g., from 0.94 to about 0.98 g/cc. Such polyethylenes include homopolyethylenes and copolymers of ethylene with small amounts of lower α-olefin propylene or butene-1. By "normally solid" is meant such polyethylene that is solid at normal room temperature, about 25° C., and has Melt Index from about 1 to about 10, preferably from about 2 to about 6, decigrams per minute (dg/min) at 190° C. and 2.16 kg load by ASTM D 1238-70, Condition E, Procedure A. Such polyethylenes are highly crystallizable and usually crystallized, and their melting points (temperature at which crystallinity disappears) are usually from about 125° C. to about 136° C., depending on their actual density and crystallinity. Typical high density polyethylenes are made, for example, by using the so-called Ziegler and Phillips Petroleum Company catalysts and technologies for polymerizing ethylene, and are commercially available from numerous sources.

The foamable compositions of high density polyethylene contain a thermally sensitive chemical foaming agent, by which is meant a material which is non-gaseous in the foamable composition but which decomposes by heating to form a gas at a decomposing temperature which is substantially above the softening temperature of the polyethylene constituent of the composition. Such agents are usually solids in finely divided powder form which are commingled and heat blended with the polyethylene by mechanically working the mixture at a temperature above the softening point temperature of the polyethylene but below the decomposing temperature of the foaming agent to obtain an intimate mixture and uniform distribution of the foaming agent particles in the polymer matrix. Suitable foaming agents are azobisformamide (also known as azodicarbonamide), 5-phenyl tetrazole, 4,4'-oxybis(benzene sulfonyl hydrazide), dinitrosopentamethylenetetramide, trihydrazino-sym-tetrazine, and hydrazodicarbonamide. On heating to a temperature above their characteristic decomposition temperature in the polyethylene composition, these chemical foaming agents decompose to form nitrogen gas and other decomposition products. The amount of starting foaming agent that is incorporated in the starting composition with high density polyethylene is selected taking into account the amount of gaseous products liberated by decomposition of the foaming agent at the foaming temperature, the efficiency that is realized in forming cells of such gas in the particular radiation-crosslinked high density polyethylene, the density (or corresponding extent of expansion) desired in the resulting foam, and prior practical experience with such systems. In the case of azobisformamide as foaming agent, this agent is usually used in concentration of from about 0.5 to about 15 percent by weight based on the mixture thereof with high density polyethylene to obtain foams in accordance with this invention having corresponding foam densities from about 30 to about 1.5 pounds per cubic foot (pcf), or from about 0.5 to about 0.024 g/cc.

The non-cellular, heat-blended compositions of high density polyethylene and foaming agent are then formed into a suitable shape which is a preform, reduced in dimensions, of the shape intended for the subsequent foam product. Usually the shape is a flat sheet which may be in the form of a lengthy tape, strip or ribbon. Alternatively the shape may be a rod, tube or other profile, preferably having at least one dimension that is relatively small to facilitate heat transfer from the surface of the article to the midst of the mass of foamable material during the foaming step. Such preforming of non-cellular foamable composition is done by any conventional plastic shaping means such as by compression molding, by extrusion, by sheeting rolls or by other means.

In some embodiments the preform is a composite structure in which the foamable high density polyethylene composition is comprised in one or more components in combination with each other and/or with other components. Such composite structures include multilayer structures or laminates in which the several layers differ in some respect such as the kind of high density polyethylene, or the kind or concentration of foaming agent, or the presence or absence of coloring matter or pigments, or in some other way. For example, in some embodiments, the foamable high density polyethylene composition is a core layer of a three-layer structure in which the outer layers are high density polyethylene without foaming agent so that the resulting foam product has a foamed core and non-cellular surface skin layers. In similar embodiments of three-layer structures, the outer layers are foamable but contain lower concentration of foaming agent than the core layer so that the resulting foam product has relatively more dense foam skin layers on a relatively lower density core.

Before the shaped preform is foamed, it is subjected to radiation effective to crosslink the high density polyethylene matrix. Such radiation is sometimes called "ionizing radiation" or "high energy radiation" by which is meant radiation obtained by streams of high energy electrons (beta rays), e.g., from Van de Graaf accelerator, protons, neutrons, or alpha particles from radioactive sources, or x-rays or gamma rays. Partial crosslinking of the polyethylene matrix is necessary to provide the viscoelastic strength and thermocollapse resistance (TCR) necessary to enable the hot polymer during the foaming step to retain the gas bubbles, especially in low density foams where the plastic cell walls are very thin.

The minimum dose of radiation effective to strengthen the TCR property of the high density polyethylene composition corresponds to the formation of slightly more than one crosslink per weight average chain of polymer. In the case of starting high density polyethylene having weight average molecular weight ($M_w$) of about 140,000, irradiated with electrons at 2 Mev (million electron volts), this minimal effective crosslinking occurs with dose of about 2 megarads (mrads). Increasing the dosage increases the number of crosslinks per weight average chain of the polymer; there are on average about 2.5 crosslinks per weight average chain of the same polyethylene irradiated with 5 mrads of 2 Mev electrons. Hot strength and TCR of the radiation-crosslinked polyethylene increase as a function of crosslink density, i.e., number of crosslinks per weight average chain of the polymer.

However, excessive crosslinking is to be avoided. Firstly, the polymer matrix should be capable of stretching during the foaming step so that the nascent gas bubbles can expand; excessively crosslinked polymer matrix presents too much elastic resistance to the expansion stress of the foaming agent and reduces its gas volume efficiency. Secondly, the elongation at rupture of the hot polymer is reduced by excessive crosslinking so that tears and large gas bubbles tend to form in the foam, especially when low density foams are desired.

The maximum practical degree of crosslinking of the high density polyethylene composition for the purpose of this invention is in the order of about 5 crosslinks per weight average chain. In the case of the polyethylene of $M_w$ 140,000 irradiated with 2 Mev electrons, this maximum allowable degree of crosslinking is obtained with dosage of about 10 mrads. Radiation in the range from about 3 to about 8 mrads is preferred, and from about 3 to about 6 mrads is most preferred, especially in making foams of low density, i.e., less than about 6 pcf, from such high density polyethylene compositions.

The extent of radiation crosslinking of high density polyethylene is also correlatable with a decrease in solubility of the polymer in solvents as measured by its "gel content." Non-crosslinked polyethylene is completely soluble in decahydronaphthalene at 130° C.; with increasing crosslinking, an increasing proportion is insoluble. For the present purposes, a degree or extent of crosslinking is suitable that provides from about 15 to about 70, preferably from about 20 to about 55, percent by weight gel fraction insoluble in decahydronaphthalene at 130° C.

The radiation-crosslinking step is carried out on the shaped preformed composition of high density polyethylene and foaming agent at any temperature up to the softening temperature of the plastic. Irradiation at ordinary room temperature is preferred. Unlike chemical crosslinking according to Benning et al., in U.S. Pat. No. 3,470,119, radiation-crosslinking of the preforms of the present invention is not significantly affected by the presence of oxygen and is usually carried out in air.

The resulting radiation-crosslinked, foamable, shaped preform of high density polyethylene and foaming agent composition is then foamed by heating to a temperature above the decomposing temperature of the foaming agent. In accordance with this invention, the heating and foaming step is carried out in the substantial absence of molecular oxygen, i.e., by excluding air and other sources of molecular oxygen from contact with the radiation-crosslinked high density polyethylene composition during the heating and foaming thereof.

In one mode, molecular oxygen is excluded from contact with the radiation-crosslinked high density polyethylene composition by surrounding the same during the heating and foaming step with oxygen-free inert gas atmosphere. Suitable inert gases include nitrogen, carbon dioxide, the noble gases, and gaseous fluorocarbons. Also suitable are vapors of liquids, such as water (steam), heat-stable glycols, and volatile liquid fluorocarbons, which are not solvents for the polyethylene. The term "gas" herein includes such vapors. Mixtures of such gases are also suitable.

In such mode, the foamable preform is placed in or passed through a foaming chamber or series of chambers from which any air has been purged by inert gas and to which inert gas is supplied to maintain an oxygen-free atmosphere therein. Heating of the foamable preform in the foaming chamber or chambers is provided by conventional means. In some embodiments, the inert gas surrounding the foamable material is itself pre-heated well above the resin foaming temperature and thereby serves as the heat transfer medium for heating and foaming the preform. In other embodiments, the foamable preform is exposed to infra-red heat from radiant gas or electric heaters in the chamber or chambers. In some embodiments, the foamable preform, while protected from contact with oxygen by an inert gas atmosphere such as nitrogen gas, is heated by floating the preform on the surface of hot liquid heat transfer medium as described hereinafter. By such means, the temperature of the foamable radiation-crosslinked high density polyethylene composition is raised above the softening temperature of the resin and above the decomposing temperature of the heat-sensitive foaming agent, and the foamable composition foams. When foaming is substantially complete, the foamed product is removed from the inert gas heating chamber and cooled.

In another mode of excluding molecular oxygen during the heating and foaming step, the foamable radiation-crosslinked high density polyethylene is immersed in a hot liquid heat-transfer medium. Liquids which are preferred are those which are thermally stable and which have normal boiling points well above the temperature necessary to foam the foamable polymer material. Suitable liquid heat transfer media are molten low-melting metals and metal alloys and molten salt mixtures such as mixtures comprising potassium nitrate and sodium nitrite, e.g., a mixture of about equal parts thereof by weight, and a mixture of 53 percent $KNO_3$, 40 percent $NaNO_2$ and 7 percent $NaNO_3$, by weight, which melts about 142° C. Such molten salt mixtures are preferred, inter alia, because they provide high temperatures at atmospheric pressure, have high heat capacity and high heat transfer coefficient, do not contaminate the resulting foam product, are readily cleansed from the foam product and are environmentally safe.

In modes using liquid heat transfer media to exclude oxygen, the foamable preform is submerged in a body of such liquid at a temperature effective to heat the foamable radiation-crosslinked high density polyethylene composition to its softening point and a temperature above the decomposing temperature of the foaming agent therein, whereby the composition foams. A discrete piece of such foamable material is held submerged by suitable mechanical means in the body of heat transfer liquid until foaming is substantially complete, then removed and cooled and cleansed, if necessary. Residual salt is washed off with water which is also a suitable cooling medium.

In continuous modes using liquid to exclude oxygen, a lengthy preform such as long strip of the foamable radiation-crosslinked high density polyethylene is passed in a continuous manner into and through a body of suitable heat transfer liquid medium so that the portion of strip in the liquid is held submerged therein during transit of the liquid body for a time sufficient to effect foaming of the strip. As the foamed strip continuously emerges from the heat transfer liquid, it is then cooled, cleansed if necessary, dried if necessary, and collected for further use or storage.

The use of liquid heat transfer media and of inert gas to exclude oxygen during the heating and foaming step are combined in some embodiments where an inert gas atmosphere is supplied and maintained in a hood or like enclosure over a vessel containing the body of liquid heat transfer medium. Such combination is particularly advantageous where the foamable radiation-crosslinked high density polyethylene preform is heated and foamed by floating the same on the surface of the liquid body.

The resulting cellular products of radiation-crosslinked high density polyethylene are novel and useful. The foamed cells are mostly closed, spheroidal or polyhedral, very uniform and small in size, i.e., in various products from less than 0.2 mm to about 5 mm equivalent diameter. The density of the foam products, which is an inverse function of the relative volumes of the gas cells and of the polymer matrix therein, is from about 1.5 pcf to about 30 pcf. The foams are strong and tough, even as low density foams, i.e., foams having foam density from about 1.5 pcf to about 6 pcf, as data shown hereinafter attest. Such foams have compressive strength under compression load at 25% deflection in the range from about 0.4 to about 520 kilograms per square centimeter ($kg/cm^2$).

The new foams are heat-formable, for example, by vacuum drawing a hot flat sheet form of the foam into a hollow mold cavity, optionally with plug assist, and cooling the drawn shape. In other heat-forming, the foam, e.g., in the form of sheet, is pressed with a heated embossing plate or roll or other device to locally compress the foam surface for obtaining three dimensional surface effects, making bend lines, integral hinges or other results. Useful articles from the new foams include gaskets, trays, boxes and other containers, impact energy shock absorbing devices, decorative and informational plaques, and toy and game boards and components.

The following examples illustrate the invention but are not to be taken as limiting its scope. Parts and percentages are by weight unless otherwise indicated or required by context.

EXAMPLE 1

One hundred grams of homopolyethylene, d 0.967 g/cc, MI 1.3, crystalline melting point 130° C., was melted on a laboratory-size two-roll compounding mill heated internally with steam at 130 psi gauge pressure. To the molten polymer was added 5.26 grams powdered azobisformamide foaming agent, and milling was continued to disperse the foaming agent into the polymer. The specific azobisformamide used was a mixture of equal parts of material sold by Uniroyal, Inc. under brand names Celogen AZ 120 and Celogen AZ 199. The azobisformamide did not decompose while being milled into the polyethylene.

Portions of the resulting milled mixture were transferred to a 6-inch by 6-inch compression mold and molded into flat sheets 0.106 inch thick. Molding conditions were: platen temperature, 140° C.; pressure, 420 psi; time, 3 minutes.

The so-molded sheets were irradiated at room temperature in air with 2 Mev electrons from a Van de Graaff accelerator to a dosage level of 5 mrads to effect partial crosslinking of the polyethylene.

In a first test, a piece 2 inches by 2 inches of the resulting non-cellular but foamable radiation-crosslinked high density polyethylene composition was foamed by completely immersing the sample in a molten salt at 250° C. for 75 seconds. The molten salt was a mixture of equal parts $KNO_3$ and $NaNO_2$.

The sample piece was immersed in the molten salt with the aid of a device comprising a smooth wire bent to the shape of a planar rectangular U with the vertical legs about 6 inches apart. On the straight horizontal wire at the bottom of the U were strung five small clamps, each capable of grasping the sample sheet and free to slide along the wire. One edge of the square sample sheet was clamped in such clamps. When the device and sample sheet thus assembled were immersed in the molten salt, the sample sheet tended to float upward and assumed a vertical position, but was held immersed by the device clamped to its bottom edge and held at adequate depth. As the sample foamable sheet foamed under such conditions, it was held immersed in the molten salt but was otherwise unrestrained. It expanded in all directions, and the clamps slid apart along the horizontal wire as the expansion of the bottom edge of the foaming sheet required.

Expansion of the foamable piece was isotropic, and the resulting foamed piece, removed from the salt, cooled, washed and dried, was a flat square sheet 4.8 by 4.8 inches and 0.25 inch thick, corresponding to volume expansion ratio of 13.6 and foam density of 0.071 g/cc (about 4.4 pcf). The cell structure was closed and very uniform at about 0.2 mm diameter throughout the sections. The sheet was flat, white in color and of excellent appearance. The edges were straight, not curled, wrinkled or cracked. The surfaces were smooth and free of blisters, scorched or discolored spots, cracks, wrinkles or other blemishes.

On standard tensile testing, the foamed radiation-crosslinked high density polyethylene product of this example was found to have tensile strength at rupture of 310 psi (based on original cross-section of the test piece) and 190 percent elongation at break.

In the mode just described in this example, the molten salt surrounding the foamable radiation-cross-linked high density polyethylene composition excluded air and molecular oxygen from contact with such foamable composition during the foaming step.

For purpose of contrast and comparison with the mode and results just described, another piece, 2 by 2 inches square, of the same molded sheet of non-cellular foamable radiation-crosslinked high density polyethylene composition was foamed in a second test in the following manner. The piece was placed on the surface of the same molten salt mixture used in the first test at 250° C., and allowed to float with one square face in contact with the molten salt while the opposite side was exposed to air, with an enclosure so that the air above the sample was also heated by the molten salt. Expansion was slower than in the first test, and the foaming was obviously non-uniform. The edges of the piece started foaming first, then began wrinkling and shrinking while the central portion of the piece was still expanding. After 135 seconds, expansion was apparently at an end, and the product was removed, cooled, washed and dried. The piece was quite irregular in shape roughly corresponding to about 3 by 3 inches and 0.16 inch thick, volume expansion ratio only about 3.4, and foam density about 0.28 g/cc (about 4 times more dense than the product of the first test). The foamed piece was very badly warped and irregular in thickness, and meaningful tensile data could not be obtained.

In a third test, another 2- by 2-inch piece of the same molded sheet used in the first test was placed on the surface of the same molten salt mixture at 250° C. in the manner of the second test, except that the air above the salt and sample was flushed out and replaced by oxygen-free nitrogen, and such nitrogen gas was maintained in the enclosure above the sample during the foaming step, thereby excluding oxygen from contact with the foaming material.

Expansion of the sample sheet in this third test was apparently uniform and complete in 140 seconds. The foam sheet product, removed from the molten salt, cooled, washed and dried, was a flat square sheet, 4.6 by 4.6 inches and 0.24 inch thick, very similar to the product of the first test. The cells were very uniform, about 0.5 mm in diameter, i.e., slightly larger than those of the foam product of the first test. No shrinking or collapse of edges or surface was apparent in the foamed product of this third test carried out with exclusion of oxygen during the foaming step.

In a fourth test, another 2- by 2-inch piece of the same starting molded sheet used in the previous tests was foamed by heating in air. The piece was suspended in a chamber through which air, preheated to 250° C., was passed. Foaming of the piece began at 70 seconds, was obviously non-uniform, and apparently ended at 256 seconds. At no time did the major dimensions exceed 3 by 3 inches, and some of the edge and corner areas, where foaming first began, were shrinking and collapsing while other areas in the central portion of the sheet were just beginning to foam or had not yet begun to foam. The resulting piece was badly warped. Although bubbled, it was not a true foam, and its density was nearly that of the starting non-cellular polyethylene.

In view of the results obtained in the second and fourth tests above, it is surprising that such excellent foams were obtained in the first and third tests from radiation-crosslinked high density polyethylene.

EXAMPLE 2

In the manner and under the same conditions described in Example 1, compositions of the same kind of high density polyethylene and powdered azobisformamide (5% based on the mixture) were melt blended on the two-roll compounding mill. The specific azobisformamide used in this Example was supplied by Eiwa Chemical Company under the brand name Vinyfor AC-K40. The melt and mill-blended mixture was compression molded in the same manner as described in Example 1 but into sheets of various thicknesses from 0.045 to 0.206 inch. These sheets were then irradiated in air at room temperature with 2 Mev electrons to dosage of 5 mrads to effect partial crosslinking of the polyethylene.

In the manner described in the first test of Example 1, 2-inch by 2-inch pieces of such irradiated sheets were then immersed in molten salt at various temperatures to effect foaming thereof, oxygen being excluded from contact with such pieces during the foaming step by the molten salt surrounding them. The specific salt used in the example was a mixture of 53% $KNO_3$, 40% $NaNO_2$ and 7% $NaNO_3$, heated to and maintained at temperatures from 215° to 275° C. Data on the various tests and resulting products are shown in Table I.

Table I

| Test No. | Original Thickness (Inches) | Foaming Temp. (°C.) | Time to Complete Expansion (Seconds) | Volume Expansion Ratio | Foam Density (g/cc) |
| --- | --- | --- | --- | --- | --- |
| 2.01 | 0.045 | 215 | 73 | 5.6 | 0.172 |
| 2.02 | 0.045 | 232 | 50 | 9.0 | 0.107 |
| 2.03 | 0.045 | 250 | 30 | 10.2 | 0.095 |
| 2.04 | 0.045 | 275 | 18 | 11.2 | 0.086 |
| 2.05 | 0.064 | 215 | 100 | 8.2 | 0.117 |
| 2.06 | 0.064 | 232 | 65 | 11.7 | 0.082 |
| 2.07 | 0.064 | 250 | 43 | 13.4 | 0.072 |
| 2.08 | 0.064 | 275 | 26 | 14.6 | 0.066 |
| 2.09 | 0.106 | 215 | 150 | 10.4 | 0.093 |
| 2.10 | 0.106 | 232 | 105 | 13.0 | 0.074 |
| 2.11 | 0.106 | 250 | 75 | 13.6 | 0.071 |
| 2.12 | 0.106 | 275 | 45 | 13.0 | 0.074 |
| 2.13 | 0.206 | 215 | 280 | 10.6 | 0.091 |
| 2.14 | 0.206 | 232 | 195 | 11.6 | 0.083 |
| 2.15 | 0.206 | 250 | 145 | 11.7 | 0.082 |
| 2.16 | 0.206 | 275 | 130 | 11.8 | 0.081 |

All of the foamed radiation-crosslinked high density polyethylene products of this Example 2 (Tests 2.01 through 2.16) were flat white sheets of excellent, uniform appearance and quality. They had very fine (less than 0.2 mm diameter) closed cell structure. Expansion was isotropic and there was no evidence of edge or surface collapse of the foam, i.e. the TCR of the composition was excellent and remained so during the foaming step. It is noteworthy that such excellent results were obtained in tests at relatively high temperature (250° and 275° C.) and at relatively short foaming times, which lead to high production rates.

EXAMPLE 3

Sheets were prepared in the manner of Example 2 and from the same materials except that the concentration of azobisformamide was varied at 5, 6, 7, 8, and 9% based on the composition and all sheets were molded to 0.105 inch thickness. The sheets were irradiated as in Example 2 with 2 Mev electrons to dosage of 5 mrads. The irradiated sheets were cut into 2-inch by 2-inch squares for foaming by submerging in the molten salt bath of Example 2 and in like manner. Data on the various tests in this Example 3 and the resulting products are shown in Table II.

As in Example 2, all of the radiation-cross-linked high density polyethylene foamed products of tests 3.01 through 3.20 of this Example 3 were flat white sheets of excellent, uniform appearance and quality and had fine closed cells and uniform structure. The foams are remarkably strong, even at low foam densities, the tensile strength/density ratios being quite uniform. The foam tensile strength increases linearly with increase of foam density in foams made from foamable compositions of high density polyethylene partially crosslinked to the same degree by the same radiation dosage level. Even higher foaming temperatures (300° C.) were used in some of these tests without damage to the foam products, but without significant further reduction in foaming time.

When sheets containing less than 5% foaming agent are foamed in accordance with this example, excellent foamed sheet products are obtained which have higher foam densities and uniform fine cells, e.g. up to about 0.5 g/cc foam density, the foam density being generally inverse to the concentration of foaming agent in the starting foamable composition. Preferred foam products having density from about 0.025 to about 0.24 g/cc (from about 1.5 to about 15 pcf) are made from compositions containing from about 1 to about 15% azobisformamide.

Table II

| Test No. | Azobis-Formamide (wt. %) | Foaming Temp (°C.) | Time to Complete Expansion (Seconds) | Volume Expansion Ratio | Foam Density (g/cc) | Foam Rupture Tensile (psi) |
|---|---|---|---|---|---|---|
| 3.01 | 5 | 225 | 94 | 12.6 | .077 | 335 |
| 3.02 | 5 | 250 | 70 | 14.0 | .069 | 305 |
| 3.03 | 5 | 275 | 45 | 13.3 | .072 | 330 |
| 3.04 | 5 | 300 | 43 | 15.5 | .065 | 324 |
| 3.05 | 6 | 225 | 89 | 14.7 | .066 | 287 |
| 3.06 | 6 | 250 | 59 | 16.7 | .058 | 253 |
| 3.07 | 6 | 275 | 45 | 15.9 | .061 | 267 |
| 3.08 | 6 | 300 | 42 | 16.8 | .056 | 255 |
| 3.09 | 7 | 225 | 84 | 16.7 | .058 | 255 |
| 3.10 | 7 | 250 | 55 | 20.9 | .046 | 205 |
| 3.11 | 7 | 275 | 49 | 19.0 | .051 | 220 |
| 3.12 | 7 | 300 | 41 | 19.2 | .050 | 208 |
| 3.13 | 8 | 225 | 87 | 20.8 | .046 | 200 |
| 3.14 | 8 | 250 | 58 | 24.8 | .039 | 175 |
| 3.15 | 8 | 275 | 45 | 23.9 | .040 | 170 |
| 3.16 | 8 | 300 | 37 | 22.3 | .043 | 195 |
| 3.17 | 9 | 225 | 88 | 22.0 | .044 | 190 |
| 3.18 | 9 | 250 | 55 | 27.8 | .035 | 160 |
| 3.19 | 9 | 275 | 42 | 26.1 | .037 | 165 |
| 3.20 | 9 | 300 | 39 | 21.3 | .045 | 200 |

EXAMPLE 4

Sheets were prepared in the manner of Example 2 and from the same materials and proportions except that all sheets were molded to 0.101 inch thickness and were irradiated to various total doses of 3 to 8 mrads with 2 Mev electrons. The irradiated sheets were cut into 2-inch by 2-inch squares for foaming by submerging in the molten salt bath of Example 2 and in like manner. Data on the various tests and on the resulting products are shown in Table III.

These results show that, for a particular combination of starting high density polyethylene and kind and concentration of foaming agent, there are optimum levels of radiation dosage (4 to 6 mrads in the case of this Example 4) and optimum foaming temperature (250°–275° C. in the case of this Example 4) to obtain best results in foam product quality.

All of the tests of Examples 2, 3 and 4 were carried out under conditions such that molecular oxygen was excluded from contact with the foaming radition-cross-linked high density polyethylene composition during the step of foaming the sample at high temperature by surrounding the sample during that step with the molten salt heat transfer medium.

Table III

| Test No. | Radiation Dose (mrads) | Foam Temp (°C.) | Time to Complete Expansion (Seconds) | Volume Expansion Ratio | Foam Density (g/cc) | Appearance | Rupture Tensile (psi) |
|---|---|---|---|---|---|---|---|
| 4.01 | 3.0 | 225 | 103 | 13.1 | .074 | Very good | 203 |
| 4.02 | 4.0 | 225 | 90 | 12.5 | .077 | Very good | 251 |
| 4.03 | 5.0 | 225 | 88 | 12.3 | .079 | Very good | 327 |
| 4.04 | 6.0 | 225 | 97 | 12.5 | .077 | Very good | 316 |
| 4.05 | 7.0 | 225 | 96 | 10.7 | .090 | Very good | 386 |
| 4.06 | 8.0 | 225 | 88 | 8.9 | .109 | Few Blisters | 454 |
| 4.07 | 3.0 | 250 | 59 | 17.3 | .056 | Very good | 181 |
| 4.08 | 4.0 | 250 | 62 | 15.5 | .062 | Excellent | 226 |
| 4.09 | 5.0 | 250 | 58 | 16.7 | .058 | Excellent | 281 |
| 4.10 | 6.0 | 250 | 57 | 12.6 | .077 | Excellent | 315 |
| 4.11 | 7.0 | 250 | 57 | 11.6 | .083 | Excellent | 361 |
| 4.12 | 8.0 | 250 | 55 | 9.9 | .098 | Few internal blisters | 414 |
| 4.13 | 3.0 | 275 | 50 | 15.5 | .062 | Good | 180 |
| 4.14 | 4.0 | 275 | 45 | 14.5 | .067 | Excellent | 224 |
| 4.15 | 5.0 | 275 | 45 | 13.3 | .073 | Excellent | 330 |
| 4.16 | 6.0 | 275 | 44 | 11.6 | .083 | Excellent | 353 |
| 4.17 | 7.0 | 275 | 45 | 10.4 | .093 | Few blisters | 386 |
| 4.18 | 8.0 | 275 | 54 | 8.7 | .111 | Many blisters | 430 |
| 4.19 | 3.0 | 300 | 40 | 14.9 | .065 | Bad surface wrinkles | 162 |
| 4.20 | 4.0 | 300 | 39 | 14.9 | .065 | Fairly good | 219 |
| 4.21 | 5.0 | 300 | 42 | 15.8 | .063 | Good | 320 |
| 4.22 | 6.0 | 300 | 40 | 12.7 | .076 | Good | 325 |
| 4.23 | 7.0 | 300 | 43 | 11.0 | .088 | Few blisters | 394 |
| 4.24 | 8.0 | 300 | 42 | 9.7 | .100 | Many blisters | 425 |

EXAMPLE 5

In this example, there was used as thermosensitive foaming agent 5-phenyl tetrazole supplied by Stephan Chemical Company under brand name Expandex OX-5-PT.

Sheets having thickness of 0.102 inch were prepared in the manner and under the conditions described in Example 1 from the same high density polyethylene and 5% of 5-phenyl tetrazole based on the whole composition. The sheets were irradiated with 2 Mev electrons to 5 mrad total dose at room temperature in air and were cut into 2-inch by 2-inch squares for testing. The test pieces were foamed using the salt mixture described in Example 2 by procedures described in Example 1 but keeping the temperature of the molten salt at 300° C.

In test 5.01, the sample was foamed by heating while totally submerged in the molten salt.

In test 5.02, the sample was foamed by heating while floating on the surface of the molten salt while oxygen-free nitrogen atmosphere was maintained in an enclosure above the sample and molten salt.

In test 5.03, the sample was foamed by heating while floating on the surface of the molten salt while exposed to air above the sample.

These tests and results are summarized in Table IV.

The exclusion of molecular oxygen from contact with the radiation-crosslinked high density polyethylene composition during the high temperature foaming thereof in tests 5.01 and 5.02 accounts for the successful formation of the good fine-celled foam products obtained in such tests in contrast to the degradation that occurred in test 5.03 when the foaming step was carried out in contact with air.

platen press for 3 minutes at 140° C. under 420 psi pressure, cooled and removed. The resulting 0.30-inch thick sheet was irradiated with 2 Mev electrons at room temperature in air to a total dose of 5 mrads to effect partial crosslinking of the polyethylene throughout the sheet, i.e. in the core and skin layers, and 2.5-inch square pieces were cut from the 3-layered sheet for testing. The test pieces were foamed using the salt mixture described in Example 2 by procedures described in Example 1 but keeping the temperature of the molten salt at 250° C.

In test 6.0, the sample was foamed by heating while totally submerged in the molten salt.

In test 6.02 the sample was foamed by heating while floating on the surface of the molten salt while the sample was exposed to air above the sample.

These tests and the results thereof are summarized in Table V.

Another piece 2.5 by 2.5 inches of the 3-layer foamable laminate was foamed in the manner and under the conditions of test 6.01, forming a foamed-core, dense skin product like that of test 6.01 as a sheet about 6 inches square. Immediately on removing the foamed-core, dense skin sheet from the molten salt, the still hot sheet was vacuum formed in a hollow hemispherical mold cavity 4 inches in diameter with a mating plug assist. Both the mold cavity and plug were initially at room temperature. In one minute, the foamed-core, dense skin molding hardened to rigid shape.

Table IV

| Test No. | Sample Position in Salt | Gas Atmosphere | Time to Complete Foaming (Seconds) | Foam Volume Expansion Ratio | Foam Density (pcf) | Remarks |
| --- | --- | --- | --- | --- | --- | --- |
| 5.01 | Submerged | None | 60 | 9.9 | 6.1 | Good, fine-celled foam |
| 5.02 | Surface Float | Nitrogen | 109 | 8.6 | 7.0 | Good, fine-celled foam, like that of 5.01 |
| 5.03 | Surface float | Air | 104 | 2.3 | 26.1 | Very badly shriveled; almost burned |

EXAMPLE 6

In this example a multilayered sandwich structure is made and foamed.

In the manner and under the conditions described in Example 2, a composition of the same kind of high density polyethylene and same kind of azobisformamide in the same proportions was made and molded into a sheet 0.15 inch thick for use as a foamable core layer. Two separate sheets 6 inches by 6 inches square and 0.075 inch thick were molded under the same conditions from polyethylene having MI 2.5 and density 0.957 g/cc, not containing any foaming agent, for use as non-foamable skin layers. The foamable core layer sheet was placed congruently between the two non-foamable skin layer sheets, and the assembly was heated in a parallel Table V

| Test No. | Sample Position in Salt | Air Atmosphere | Time to Complete Foaming (Seconds) | Foam Core Volume Expansion Ratio | Foam Core Density (pcf) | Overall Density (pcf) | Flex Strength (psi) | Remarks |
| --- | --- | --- | --- | --- | --- | --- | --- | --- |
| 6.01 | Submerged | None | 155 | 15.5 | 3.87 | 7.74 | 16,200 | (2) |
| 6.02 | Surface float | Air | 259 | 5.3 | 11.3 | 22 | (1) | (3) |

Notes:
(1) The product was too distorted to test.
(2) The sheet product was flat, with smooth surfaces and good appearance. The core was foam with uniform fine cells, and expansion was isotropic. There was no sign of foam collapse or shrivel. The non-cellular skin layers had been thinned to 0.012 inch during expansion of the sheet.
(3) The sheet product was very badly distorted. The skins were partially loosened from the core, which was only partially and irregularly foamed, with evidence of foam collapse and shrinkage. There was severe shrinkage at the edges of the sheet. Not an example of the invention.

EXAMPLE 7

Foamable sheets, 0.106 inch thick, of high density polyethylene containing 5% azobisformamide were made from the materials and in the manner described in Example 1. Two pieces 2 inches square of such sheet were foamed at the same time by total submersion in molten salt at 250° C. in the manner described in Example 1. After 20 seconds, the resulting foamed pieces were removed from the salt and immediately placed together with major flat surfaces in contact and their edges in register and held under light pressure until they cooled. The two foam sheets welded together at their interface to form a single integrally bonded foam sheet 4.8 inches by 4.8 inches by 0.49 inch thick having overall density of 0.074 g/cc. Thicker slabs and blocks of such foam are made in like manner by increasing the number of initial foam sheets that are stacked together while still hot and allowing the layers to bond together as the stack cools.

EXAMPLE 8

In this example, 100 parts of high density polyethylene having density 0.964 g/cc and Melt Index of 6 dg/min. was compounded with six parts of finely powdered azobisformamide foaming agent, heat plastified and extruded into a long non-cellular strip 0.124 inch thick and 2.75 inches wide without decomposing the foaming agent. The strip was then irradiated at room temperature with high energy electrons from a Van de Graaff generator to a dose level of 6 megarads to effect partial crosslinking of the polyethylene therein.

The resulting crosslinked, non-cellular, foamable strip was foamed in continuous manner by preheating the strip to approximately 123° C. and passing it at about 26 linear inches per minute into a body of molten salt as described in Example 1 maintained at a temperature of 242° C. A hinged plate endless belt travelling in part beneath the surface of the molten salt at a constant speed of 174 linear inches per minute in the same direction as the strip being processed was used to generate and maintain a dynamic layer of molten salt between the belt and the strip, which dynamic layer of the molten salt held the strip beneath the surface of the body of the molten salt while it was foaming. The strip was submerged in the molten salt through a path of about 66 inches during which the strip foamed to a foamed strip 4.6 inches wide and 0.228 inch thick which was taken out of the molten salt at linear speed about 120 inches per minute, washed with water, cooled in air, and dried. The resulting foam strip product had average foam density about 4.69 pcf, fine closed cells, smooth surfaces, uniform structure, white color and excellent appearance.

EXAMPLE 9

Example 8 was substantially repeated except that the starting high density polyethylene (density 0.964 g/cc) had Melt Index 5 dg/min. and was mixed with 4 parts (per 100 parts polyethylene) of azobisformamide blowing agent as used in Example 1. The composition was heat plastified and extruded as a long non-cellular strip 2.5 inches wide and 0.125 inch thick. That strip was then irradiated as in Example 8. The resulting irradiation-crosslinked foamable high density polyethylene strip was preheated to 125° C., passed continuously to and submerged in the molten salt bath as described in Example 8, the salt being maintained at 249° C. The strip was foamed to a foam strip 5.5 inches wide and 0.201 inch thick. As the foam strip emerged from the molten salt, it was washed in water at 60° C. The resulting foam product had average foam density of 4.7 pcf, fine closed cells, smooth surfaces, uniform structure, white color and excellent appearance.

EXAMPLE 10

One hundred parts of homopolyethylene (density 0.964 g/cc and MI 5.0) and 7 parts CELOGEN AZ-199 powdered azobisformamide obtained from Uniroyal, Inc. were mixed in a twin screw extruder and extruded at a gel temperature of about 150°-157° C. into a flat sheet 0.080 inch thick by 7 inches wide. The so-formed sheet was irradiated at room temperature in air with 2 Mev electrons from a Van de Graaff accelerator to a dosage level of 5.5 mrads to effect partial crosslinking of the polyethylene.

In a series of tests, specimens 1 inch by 1 inch of the resulting non-cellular but foamable radiation-crosslinked high density polyethylene composition were foamed by immersing the specimens in a heated liquid bath maintained at foaming temperature. The specimens were held beneath the surface of the heated bath by means of the foam volume recording apparatus described by L. C. Rubens in the *Journal of Cellular Plastics,* Vol. 1, No. 2, page 6 (April, 1965). This apparatus directly plots expansion of the foam against time elapsed from immersion of the specimen such that the ratio of foam volume ($V_F$) to starting specimen volume ($V_S$) is continuously recorded during the time the specimen is in the heated bath.

In one set of tests, the heated liquid bath was a molten salt mixture in accordance with the teachings of the present invention, which mixture comprised 53% $KNO_3$, 40% $NaNO_2$, and 7% $NaNO_3$. For purposes of comparison and contrast, a second set of tests was carried out using a heated bath of silicone oil. The specific oil used was supplied by Dow Corning Corporation under the brand name 710 Silicone Oil, which has a viscosity of 475–525 cs at 25° C. The results of these tests are shown in Table VI.

As demonstrated by these tests, maximum expansion of the foamable composition in a molten salt bath is significantly greater than that obtainable in a silicone oil bath maintained at the same temperature. Also noteworthy is the fact that while the specimens in the molten salt bath were still increasing in volume, those in silicone oil were showing signs of undesirable foam collapse. It is believed that this collapse is due to oxidative scission of the polyethylene network caused by a reaction with oxygen dissolved in the silicone oil. For these reasons, as well as those described earlier, e.g., ease of cleansing the foam product, molten salt mixtures are the preferred heat transfer media for the process of the present invention. Silicone oils and the like cannot be used interchangeably in commercial operation with molten salt mixtures to obtain the equivalent high quality foam product from radiation-crosslinked high density polyethylene foamable compositions.

Table VI

| Test No. | Liquid Bath | Foaming Temperature (°C.) | Time (min) | $V_F/V_S$ |
|---|---|---|---|---|
| 10.01 | Salt | 200 | 3 | 2 |
|  |  |  | 5 | 6 |
|  |  |  | 7 | 9 |
| 10.02 | Salt | 210 | 2 | 7 |
|  |  |  | 3 | 15 |
|  |  |  | 4 | 18 |
|  |  |  | 5 | 18.5 |
|  |  |  | 6 | 19 |
| 10.03 | Salt | 220 | 0.5 | 1 |
|  |  |  | 1.0 | 7.5 |
|  |  |  | 1.5 | 23 |
|  |  |  | 2.0 | 25 |
|  |  |  | 2.5 | 26 |
| 10.04 | Oil[1] | 200 | 3 | 1.5 |
|  |  |  | 5 | 3 |
|  |  |  | 7 | 6 |
| 10.05 | Oil[1] | 210 | 2 | 2 |
|  |  |  | 3 | 8 |
|  |  |  | 4 | 15 |

Table VI-continued

| Test No. | Liquid Bath | Foaming Temperature (°C.) | Time (min) | $V_F/V_S$ |
|---|---|---|---|---|
| | | | 5 | 15 |
| | | | 6 | 9 |
| 10.06 | Oil[1] | 220 | 0.5 | 1 |
| | | | 1.0 | 2 |
| | | | 1.5 | 9 |
| | | | 2.0 | 24 |
| | | | 2.5 | 22 |

Notes:
[1] Not an example of the invention.

EXAMPLE 11

To demonstrate the differences in foaming behavior between high density polyethylene and low density polyethylene in a process outside the scope of the present invention, heat foamable compositions containing 13 weight percent azobisformamide blowing agent were prepared by hot melt mixing various polyethylenes and the blowing agent on a two-roll compounding mill for 10 minutes at a temperature in the range of 145°–155° C. Portions of the milled mixtures were compression molded under 600 psi at 145° C. for 3 minutes to obtain flat sheets 0.1 inch thick. The so-molded sheets were cooled and then irradiated at room temperature in air with 2 Mev electrons to the desired dosage level to effect partial crosslinking of the polyethylene. The specific dosages given the sheets and the properties of the starting polyethylenes are described in Table VII.

In the manner described in the second test of Example 1, 2-inch by 2-inch samples of the irradiated sheets were foamed on the surface of a molten salt bath maintained at a temperature of 225° C. The salt bath composition was the same as that used in Example 10. All of the low density polyethylene compositions (Samples 11.01–11.03) started to expand after 70 to 80 seconds on the surface of the molten salt and achieved maximum expansion after about 170 seconds. The so-formed products were of excellent quality having uniform fine-cell structure with no evidence of edge shrivelling or surface pocks. In comparison, all of the high density polyethylene compositions (Samples 11.04–11.06) started to expand after about 90 seconds on the surface of the molten salt and achieved maximum expansion after about 3 minutes. In contrast to the fine quality products obtained from the low density polyethylene compositions, however, the products prepared from the high density polyethylene compositions were shrivelled on the edges and showed a significant degree of foam collapse, resulting in a number of surface pocks one-half inch or more in diameter. Similar results were obtained when the radiation dosage was increased to 7 or decreased to 3 mrads.

These results clearly indicate the criticality of foaming a radiation-crosslinked high density polyethylene composition in a substantially oxygen-free medium.

Table VII

| Sample No. | Density (g/cc) | MI | Molecular Weight | Radiation Dose (mrads) |
|---|---|---|---|---|
| 11.01 | 0.915 | 3.6 | 179,000 | 4.0 |
| 11.02 | 0.921 | 2.3 | 119,000 | 4.5 |
| 11.03 | 0.923 | 3.8 | 157.000 | 5.0 |
| 11.04 | 0.945 | 5.4 | 96,600 | 5.0 |
| 11.05 | 0.963 | 2.2 | 116,400 | 5.0 |
| 11.06 | 0.971 | 6.7 | 105,800 | 5.0 |

What is claimed is:

1. A method which comprises the steps of
  (a) intimately mixing together a mixture comprising high density polyethylene and thermosensitive chemical foaming agent which decomposes to form a gas at a decomposing temperature above the softening point temperature of the polyethylene to form a non-cellular foamable composition,
  (b) shaping the resulting composition into a non-cellular foamable shape at a temperature below the decomposing temperature of the foaming agent,
  (c) subjecting the resulting non-cellular foamable shape to high energy radiation to effect crosslinking of the polyethylene therein, and
  (d) foaming the resulting radiation-crosslinked high density polyethylene-containing foamable shape by heating the same in at least one substantially oxygen-free medium selected from the group consisting of inert gasses and molten low-melting salts to a temperature above the decomposing temperature of the thermosensitive foaming agent in the composition of the foamable shape, thereby making a foamed radiation-crosslinked high density polyethylene foam product having substantially closed and uniform fine-celled foam structure.

2. The method of claim 1 wherein the inert gas is nitrogen gas.

3. The method of claim 1 wherein the molten low-melting salt comprises potassium nitrate and sodium nitrite.

4. The method of claim 3 wherein the foaming agent in the starting mixture is azobisformamide in amount such that the foam density of the resulting foam product is from about 0.024 to about 0.24 g/cc, the non-cellular foamable shape is a sheet and is irradiated with high energy electrons to dosage from about 3 to about 7 mrads, and the temperature of the molten low-melting salt in the foaming step (d) is from about 215° to about 300° C.

5. As a new manufacture, foamed radiation-crosslinked high density polyethylene having substantially closed fine cells, uniform structure, compressive strength under compression load at 25% deflection from about 0.4 to about 520 kg/cm², and foam density from about 0.024 to about 0.5 g/cc, made by the method of claim 1.

6. As a new manufacture, foamed radiation-crosslinked high density polyethylene sheet having substantially closed fine cells, uniform structure, compressive strength under compression load at 25% deflection from about 0.4 to about 260 kg/cm², and foam density from about 0.024 to about 0.24 g/cc, made by the method of claim 4.

* * * * *

UNITED STATES PATENT AND TRADEMARK OFFICE
CERTIFICATE OF CORRECTION

PATENT NO. : 4,186,068
DATED : January 29, 1980
INVENTOR(S) : Louis C. Rubens

It is certified that error appears in the above-identified patent and that said Letters Patent are hereby corrected as shown below:

Column 3, line 45, "dinitrosopentamethylenetetramide" should read -- dinitrosopentamethylenetetramine --;

Column 5, line 8, "purpose" should read -- purposes --;

Column 7, line 7, "5" should read -- 0.5 --;

Column 11, Table III, third column heading "Foam Temp ($^{\circ}$C" should read -- Foam Temp ($^{\circ}$C) --.

Signed and Sealed this

Third Day of June 1980

[SEAL]

Attest:

SIDNEY A. DIAMOND

Attesting Officer

Commissioner of Patents and Trademarks